United States Patent
Peters et al.

(10) Patent No.: US 10,087,884 B2
(45) Date of Patent: Oct. 2, 2018

(54) STEPPED FAIRING MODULATED EXHAUST COOLING

(71) Applicant: United Technologies Corporation, Hartford, CT (US)

(72) Inventors: Donald W. Peters, Colchester, CT (US); James P. Bangerter, Manchester, CT (US)

(73) Assignee: United Technologies Corporation, Farmington, CT (US)

(*) Notice: Subject to any disclaimer, the term of this patent is extended or adjusted under 35 U.S.C. 154(b) by 341 days.

(21) Appl. No.: 14/877,607

(22) Filed: Oct. 7, 2015

(65) Prior Publication Data

US 2016/0169108 A1    Jun. 16, 2016

Related U.S. Application Data

(60) Provisional application No. 62/091,991, filed on Dec. 15, 2014.

(51) Int. Cl.
| | |
|---|---|
| *F02K 1/12* | (2006.01) |
| *B64D 33/04* | (2006.01) |
| *F02K 1/08* | (2006.01) |
| *F02K 1/09* | (2006.01) |
| *F02K 1/82* | (2006.01) |

(52) U.S. Cl.
CPC ............ *F02K 1/1223* (2013.01); *B64D 33/04* (2013.01); *F02K 1/08* (2013.01); *F02K 1/09* (2013.01); *F02K 1/1292* (2013.01); *F02K 1/822* (2013.01); *Y02T 50/672* (2013.01); *Y02T 50/675* (2013.01)

(58) Field of Classification Search
CPC .......... F02K 1/08; F02K 1/085; F02K 1/1223; F02K 1/383; F02K 1/386; F02K 3/075; F02K 1/09; F02K 1/15
See application file for complete search history.

(56) References Cited

U.S. PATENT DOCUMENTS

| | | | | |
|---|---|---|---|---|
| 3,598,319 | A | * | 8/1971 | Howald ................. F02K 1/123 239/265.19 |
| 4,285,194 | A | * | 8/1981 | Nash ...................... F02K 1/822 60/262 |
| 4,621,769 | A | * | 11/1986 | Szuminski ............ F02K 1/1292 239/265.39 |
| 5,020,318 | A | | 6/1991 | Vdoviak |
| 5,319,927 | A | | 6/1994 | Maguire |
| 5,335,489 | A | | 8/1994 | Thayer |
| 5,946,904 | A | | 9/1999 | Boehnlein |
| 7,032,835 | B2 | | 4/2006 | Murphy |
| 7,757,477 | B2 | | 7/2010 | Kehret |
| 2005/0091964 | A1 | * | 5/2005 | Curtelin .................. F01D 9/06 60/262 |

(Continued)

FOREIGN PATENT DOCUMENTS

GB        2119022 A      11/1983

OTHER PUBLICATIONS

EP search report for EP15190014.9 dated May 12, 2016.

*Primary Examiner* — Andrew Nguyen
(74) *Attorney, Agent, or Firm* — O'Shea Getz P.C.

(57) ABSTRACT

Aspects of the disclosure are directed to a system of an aircraft, comprising: at least one fairing, a liner, and an actuator configured to cause the at least one fairing to be translated relative to the liner in order to obtain a modulation of a metering area between the liner and the at least one fairing.

9 Claims, 5 Drawing Sheets

(56) References Cited

U.S. PATENT DOCUMENTS

| | | |
|---|---|---|
| 2009/0016874 A1* | 1/2009 | Corsmeier .............. F02K 3/075 415/145 |
| 2009/0065610 A1 | 3/2009 | Cowan et al. |
| 2009/0158703 A1 | 6/2009 | Petty |
| 2010/0000197 A1 | 1/2010 | Snyder |
| 2012/0227375 A1 | 9/2012 | Badcock |
| 2014/0079530 A1 | 3/2014 | Ferch |
| 2014/0202539 A1 | 7/2014 | Landre |

* cited by examiner

STEPPED FAIRING MODULATED EXHAUST COOLING

This application claims priority to U.S. Patent Appln. No. 62/091,991 filed Dec. 15, 2014.

STATEMENT REGARDING FEDERALLY SPONSORED RESEARCH OR DEVELOPMENT

This invention was made with government support under contract number FA8650-09-D-2932 awarded by the United States Air Force. The government has certain rights in the invention.

BACKGROUND

In aircraft environments, an exhaust cooling environment typically includes a first area and a second area that is downstream from the first area. The first area may be referred to as a metering area and the second area may be referred to as a discharge/exit area.

In conventional exhausting cooling environments, the metering area has a flat or consistent profile. Such a profile results in a loss of momentum in terms of a flow of air. This loss of momentum results in a degradation in terms of engine efficiency/performance.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system of an aircraft, comprising: at least one fairing, a liner, and an actuator configured to cause the at least one fairing to be translated relative to the liner in order to obtain a modulation of a metering area between the liner and the at least one fairing. In some embodiments, the at least one fairing comprises a plurality of fairings. In some embodiments, the at least one fairing comprises metal. In some embodiments, the system further comprises: a convergent flap and a divergent flap that define a throat associated with the system. In some embodiments, the metering area controls a radial dimension associated with the throat. In some embodiments, the metering area is based on a shape of the liner relative to a shape of the at least one fairing. In some embodiments, the metering area is based on a position of the liner relative to a position of the at least one fairing. In some embodiments, the metering area is based on a gap that exists between the liner and the at least one fairing. In some embodiments, the system is associated with an exhaust of an engine of the aircraft. In some embodiments, the metering area adjusts a first flow that flows through the engine relative to a second flow that bypasses the engine.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
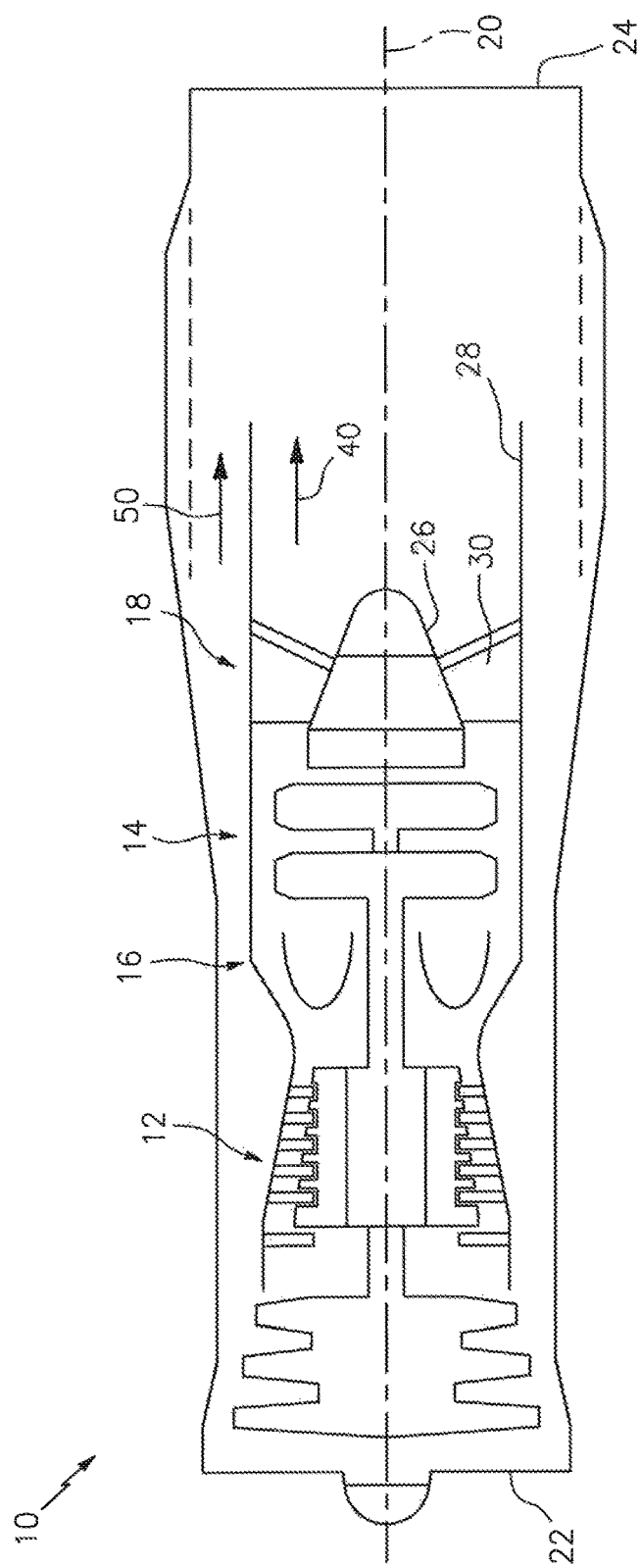
FIG. 1 illustrates a gas turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for modulating a metering area in relation to a nozzle throat area. The metering may be based on a relationship between a liner and one or more fairings. The modulated metering may be used to extract thrust in conjunction with one or more flows.

Aspects of the disclosure may be applied in connection with a gas turbine engine. For example, FIG. 1 is a side-sectional illustration of a gas turbine engine 10. The engine 10 includes a compressor section 12, a turbine section 14 and one or more engine hot sections. The engine hot sections may include, for example, a first engine hot section 16 configured as a combustor section and a second engine hot section 18 configured as an augmenter section. The compressor section 12, the first engine hot section 16, the turbine section 14 and the second engine hot section 18 may be sequentially aligned along an axial centerline 20 between a forward engine airflow inlet 22 and an aft engine airflow exhaust 24. One skilled in the art would appreciate that in proximity to the exhaust 24 there may exist the nozzle throat area that is representative of an exhaust nozzle physical area. The nozzle throat area is described further below in connection with FIG. 2 (reference character 250).

FIG. 1 represents one possible configuration for an engine 10. Aspects of the disclosure may be applied in connection with other engine configurations.

One skilled in the art would appreciate that, in connection with the design and operation of an engine (e.g., engine 10), there may exist at least two flows. A first such flow, which may be referred to as a core flow 40, may pass through the engine hardware and be subjected to combustion in, e.g., the first engine hot section 16. A secondary flow, which may be referred to as a bypass flow 50, bypasses the engine core. A bypass ratio may be established for denoting the ratio between the bypass flow 50 and the core flow 40.

Aspects of the disclosure may be used to adjust the bypass ratio. For example, aspects of the disclosure may be used to reduce the bypass flow or increase the core flow. An adjustment of the bypass ratio may be provided in order control or regulate engine performance/efficiency. In this respect, a metering of the flow(s) may be provided.

Figure 2:
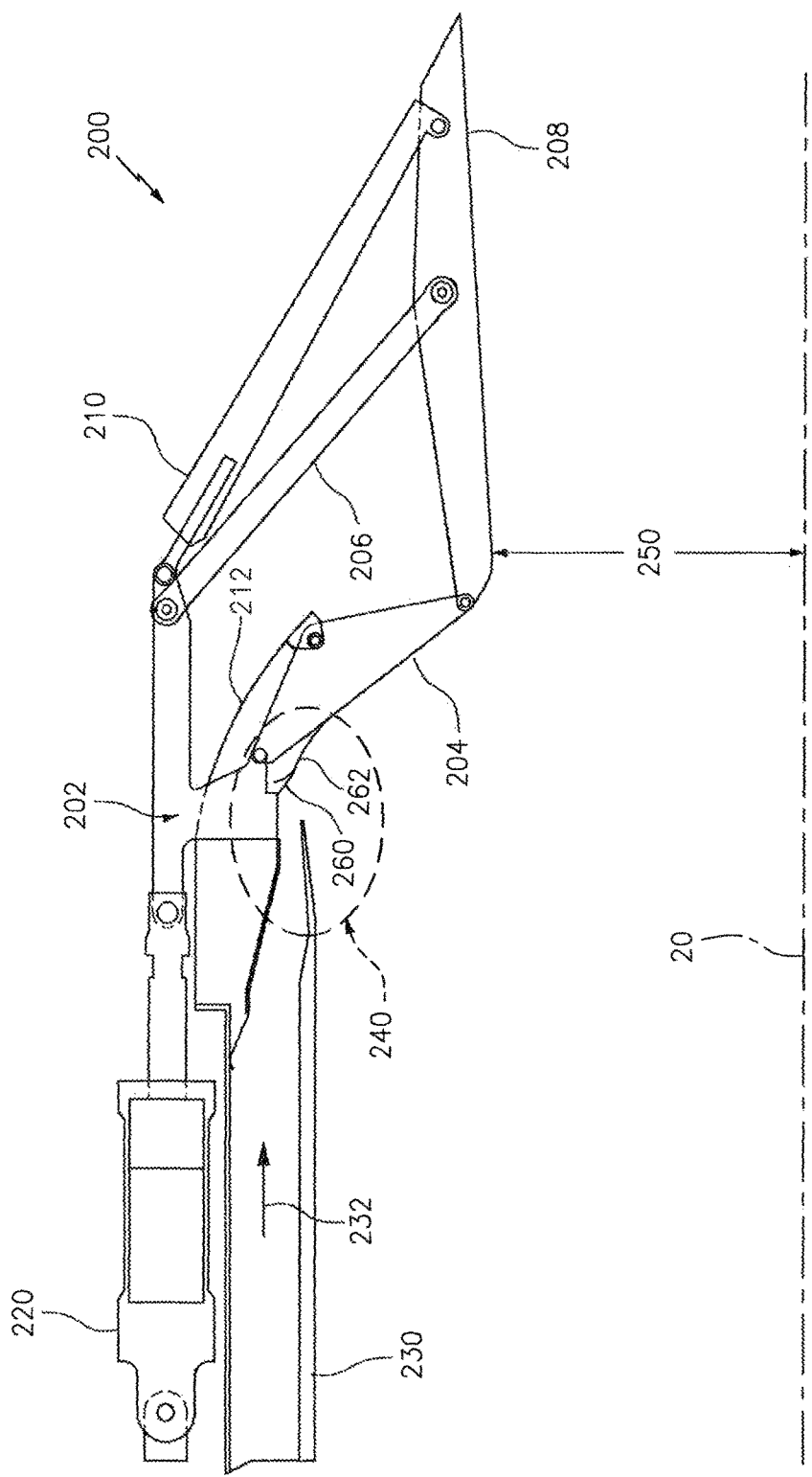
FIG. 2 illustrates an exemplary system for implementing a modulated metering area.

Referring to FIG. 2, a system 200 is shown. The system 200 may be associated with one or more portions of an engine (e.g., engine 10 of FIG. 1), such as an exhaust (e.g., exhaust 24). The system 200 includes a number of components/devices that are described below. The system 200 may be used to provide for a modulated metering of one or more flows.

Synchronization (sync) rings 202 are configured to move forward and aft (or left and right, respectively, in FIG. 2), relative to a fixed/static structure 212. The movement of the sync rings 202 serves to move or displace a convergent flap/seal 204, a strut 206, a divergent flap/seal 208, and an external flap 210. in some embodiments, one or more actuators 220 may be used to facilitate or provide for such translation.

The system 200 may include a liner 230. The liner 230, which may be referred to as an augmented liner, may define a channel 232 that conveys at least a portion of the bypass flow. The sync rings 202, a portion of the static structure 212, and a portion of the bypass channel 232 may be representative of a modulated exhaust cooling (MEC) area 240. The area 240 is referred to as being "modulated" due to the fact that its size/dimension may change based at least in part on a position of the liner 230 relative to one or more fairings as described further below.

An axial translation of one or more of the components described above may serve to control a radial dimension of the nozzle throat area 250, a portion of which is shown via a dashed line in FIG. 2 for reference purposes. The translation may be provided by the actuator(s) 220. The convergent flap 204 and the divergent flap 208 may define the nozzle throat area 250. The MEC area 240 may be a function of the nozzle throat area 250.

The system 200 also includes a sync ring fairing 260 and a c-flap/c-seal fairing 262. The role/function of such fairings 260 and 262 are described in further detail below.

In some instances, a discharge area is (significantly) larger than a metering area. This may be inefficient from a perspective of aerodynamics and may result in a loss of flow momentum. To maximize/increase performance, it may be desirable for the metering area and the discharge area to he approximately the same, but capable of varying with the nozzle throat area. In doing so, momentum of the flow may be maintained and it may be possible to gain or extract some thrust from the flow.

Figure 3A:
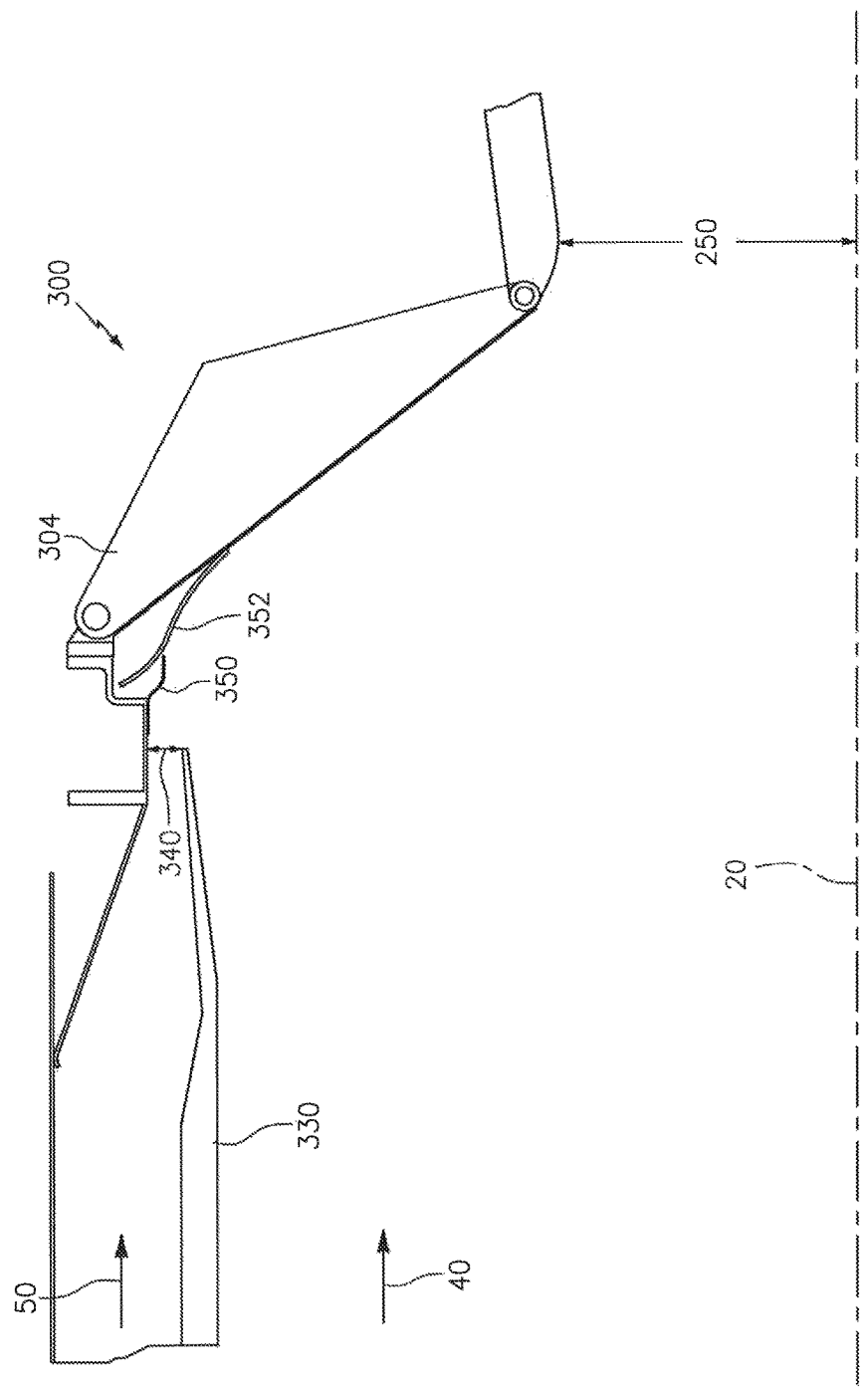
FIGS. 3A-3C illustrate a sequence in a change of a metering area relative to a nozzle throat area.
Figure 3B:
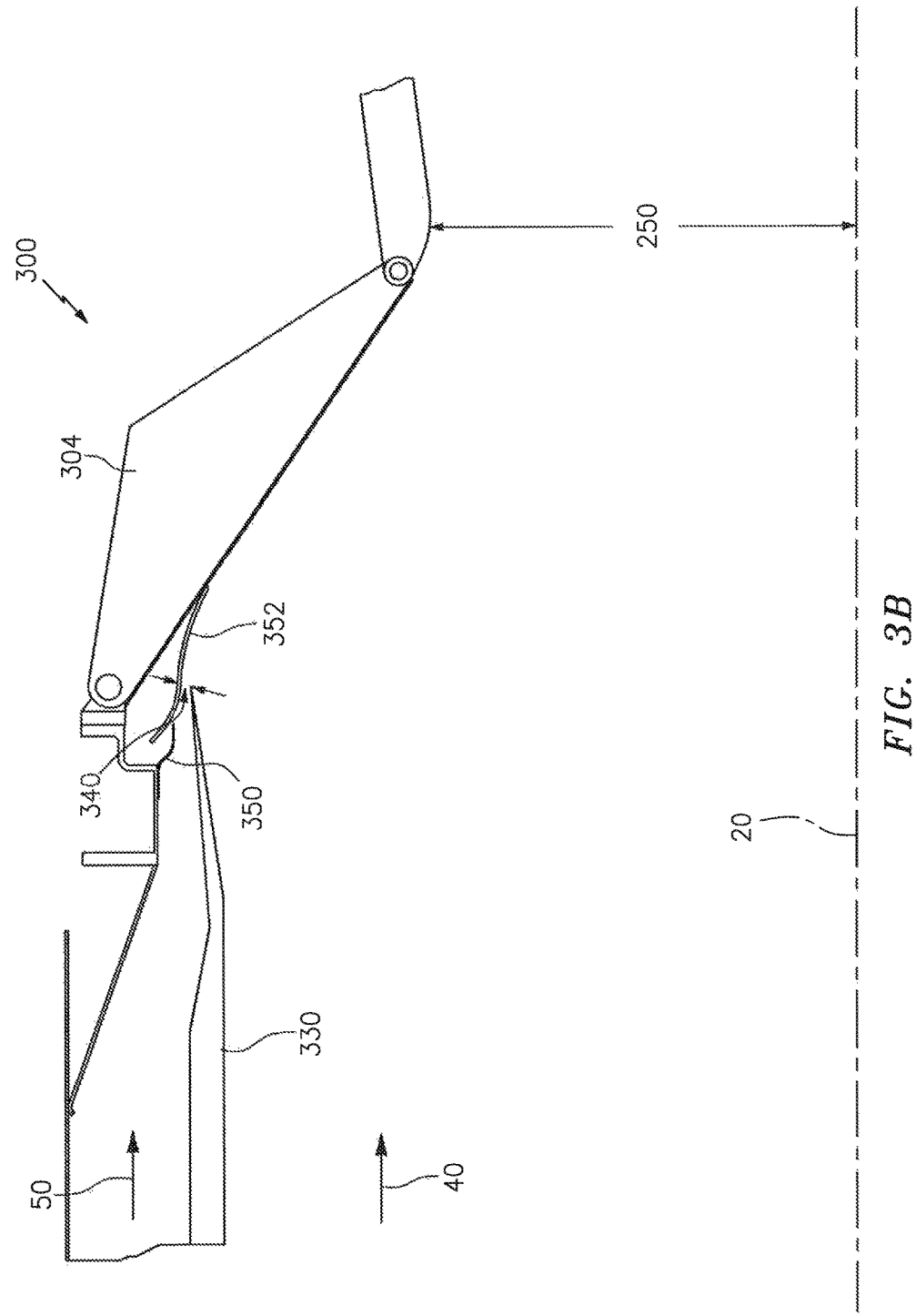
Figure 3C:
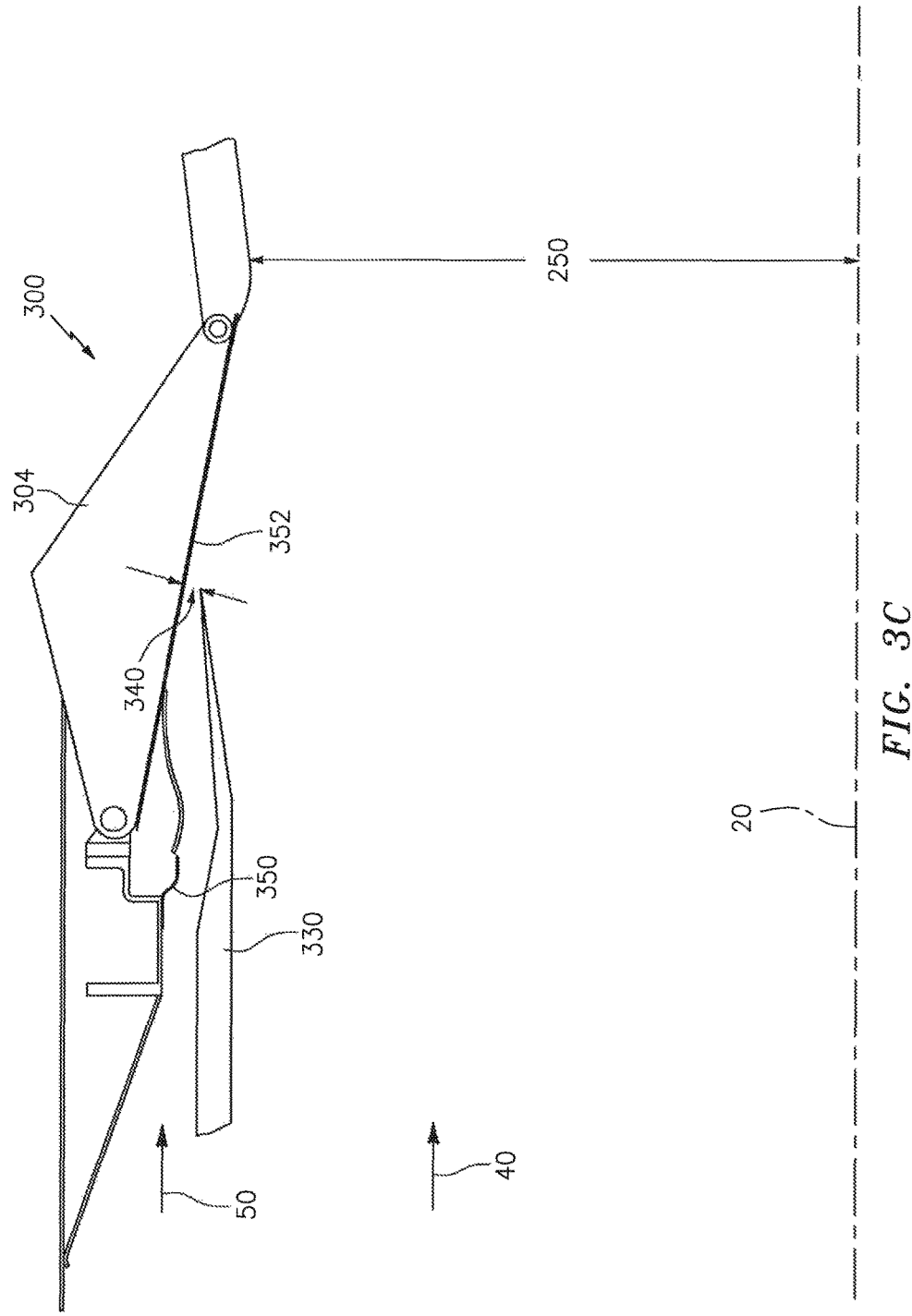

Referring now to FIGS. 3A-3C, a system 300 (which may correspond to at least a portion of the system 200) is shown at various stages/sequences of operation. In particular, FIGS. 3A-3C illustrate an implementation that realizes a metering area 340 (which may correspond to the MEC area 240) as a function of a nozzle throat area (e.g., nozzle throat area 250). FIG. 3A corresponds to a minimum value for the nozzle throat area, FIG. 3B corresponds to an intermediate value for the nozzle throat area, and FIG. 3C corresponds to a maximum value for the nozzle throat area.

In FIGS. 3A-3C, a liner 330 (which may correspond to the liner 230 of FIG. 2) and a convergent flap 304 (which may correspond to the convergent flap 204 of FIG. 2) are shown as being coupled to one another via one or more fairings, such as fairings 350 and 352. The fairing 350 may correspond to the fairing 260, and the fairing 352 may correspond to fairing 262.

The fairings 350 and 352 may be made of one or more materials (e.g., metal, composite, etc.). The shape/geometry/form-factor of the fairings 350 and 352 may be selected in conjunction with the shape/geometry/form-factor of the liner 330 to obtain the particular metering area 340. The metering area 340 may also be based on, or a function of, the position of the augmented liner 330 relative to the fairings 350 and 352, and any gap that may exist between the augmented liner 330 and the fairings 350 and 352. In this respect, a modulation of the metering area 340 may be obtained based on these input factors/conditions. The modulation of the metering area 340 may be stepped in the sense that the metering area 340 may take on discrete values. In some embodiments, the modulation of the metering area 340 may be continuous in the sense that the metering area 340 may assume a value within a continuous range of values.

Technical effects and benefits of this disclosure include a realization of an exit flow that is approximately the same as a metering flow. In this manner, performance/efficiency may be increased/maximized by being able to extract thrust from the flow. Furthermore, such thrust may be obtained without a need to incorporate/implement a separate actuation mechanism, thereby maximizing/increasing reliability and minimizing/reducing complexity and weight. In this respect, a passive metering is provided as a function of the nozzle throat area.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A system for a gas turbine engine, comprising:
   at least one fairing;
   a liner;
   a convergent flap and a divergent flap that define a throat of the system; and
   an actuator configured to cause the at least one fairing to be translated relative to the liner in order to obtain a modulation of a metering area between the liner and the at least one fairing,
   wherein the modulation of the metering area by the actuator controls a radial dimension of the throat, and
   wherein the modulation of the metering area by the actuator adjusts a bypass ratio between a first flow that is subjected to combustion in a core of the gas turbine engine and a second flow that bypasses the core.

2. The system of claim 1, wherein the at least one fairing comprises a plurality of fairings.

3. The system of claim 1, wherein the at least one airing comprises metal.

4. The system of claim 1, wherein the metering area is based on a shape of the liner relative to a shape of the at least one fairing.

5. The system of claim 1, wherein the metering area is based on a position of the liner relative to a position of the at least one fairing.

6. The system of claim 1, wherein the metering area is based on a gap that exists between the liner and the at least one fairing.

7. The system of claim 1, wherein the system is associated with an exhaust of the gas turbine engine.

8. A gas turbine engine, comprising:
   a combustor section;
   an exhaust nozzle;
   at least one fairing;
   a liner;
   a convergent flap and a divergent flap that define a throat of the exhaust nozzle; and
   an actuator configured to cause the at least one fairing to be translated relative to the liner to obtain a modulation of a metering area between the liner and the at least one fairing,
   wherein the modulation of the metering area controls a dimension of the throat, and wherein the modulation of the metering area adjusts a bypass ratio between a first flow that is subjected to combustion in the combustor section and a second flow that bypasses the combustor section.

9. The gas turbine engine of claim 8, wherein the modulation of the metering area controls a radial dimension of the throat.

\* \* \* \* \*

UNITED STATES PATENT AND TRADEMARK OFFICE
CERTIFICATE OF CORRECTION

PATENT NO.        : 10,087,884 B2
APPLICATION NO.   : 14/877607
DATED             : October 2, 2018
INVENTOR(S)       : Donald W. Peters and James P. Bangerter Page 1 of 1

It is certified that error appears in the above-identified patent and that said Letters Patent is hereby corrected as shown below:

In the Claims

In Column 4, Line 42, in Claim 3, delete "airing" and insert -- fairing --

Signed and Sealed this
First Day of January, 2019

Andrei Iancu
*Director of the United States Patent and Trademark Office*